3,159,596
PROCESS FOR VULCANIZING ACID FILLER CONTAINING SATURATED OLEFIN COPOLYMERS WITH ORGANIC PEROXIDES AND SULFUR
Luigi Falcone and Romano Matteucci, both of Ferrara, Italy, assignors to Montecatini Società Generale per l'Industria Mineraria e Chimica, Milan, Italy, a corporation of Italy
No Drawing. Filed July 27, 1960, Ser. No. 45,546
Claims priority, application Italy July 30, 1959
11 Claims. (Cl. 260—41)

The present invention relates to a process for vulcanizing amorphous saturated copolymers of alpha-olefins containing acid fillers, particularly ethylene-propylene copolymers containing such fillers, with organic peroxides not affected by such acid fillers.

In various patents, and particularly in Italian Patent No. 587,681 and in the first patent application of addition thereto, filed on July 7, 1959, processes are described for the vulcanizing of mixes of such copolymers utilizing organic peroxides and sulfur or quinonic compounds.

However, when mixes of ethylene-propylene copolymers ethylene-butene copolymers, or the like, which copolymers are ordinarily vulcanizable with organic peroxides, are used in such applications as insulating sheaths for electric cables, transparent and colored articles, etc., for which applications acid fillers must be used, the vulcanizability thereof is adversely affected by the acid fillers. Therefore, in order to carry out the vulcanization, the addition of basic substances capable of neutralizing such acid fillers has been required heretofore.

It is an object of our invention to eliminate the inconvenience of having to add a basic substance to neutralize the acid fillers.

Another object is to provide a method of directly vulcanizing copolymers of saturated alpha-olefins containing acid fillers without the initial step of neutralizing said acid fillers.

Additional objects will become apparent hereinafter.

Surprisingly, we have found that vulcanization can be carried out in the presence of acid fillers without the addition of basic substances, if peroxides represented by the following formula are used:

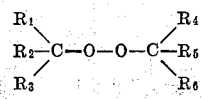

wherein $R_1$, $R_2$, $R_3$, $R_4$, $R_5$, $R_6$ are each alkyl groups or substituted alkyl groups whose hydrogen atoms are substituted in whole or in part with halogen atoms. Suitable peroxides includes, e.g., tertiary butyl and tertiary amyl peroxides, either unsubstituted or having one or more of their hydrogen atoms substituted with halogens.

The alkyl peroxides of our invention, whether halogenated or not, should be used in an amount from about 0.5 to 10% based on the weight of the copolymer. Sulfur should be used in combination with the peroxide in an amount from about 0.3 to 1.5 gram-atoms per mole of peroxide.

The above type of peroxide is virtually unaffected by the acidity of the filler. Thus, it is possible to obtain elastomers containing acid fillers, which elastomers are excellently suited for the aforementioned purposes (insulating sheaths, etc.). Any acid filler, either of the carbon black type ("channel" carbon black) or of the clay or silica type, can be used, and yet the use of the above type of peroxide and sulfur permits ready vulcanization of the alpha-olefin copolymer.

However, yet a further improvement is obtained by adding from about 0.1 to 20% (based on the filter) of a metal compound, i.e., an oxide, hydroxide, basic salt, or salt of a weak acid, wherein the metal is selected from Groups I, II, III or VIII of the Periodic Table. Typical metal compounds include MgO, PbO, ZnO, $Fe_2O_3$, CaO, $Pb(OH)_2$, $Zn(OH)_2$, $Fe(OH)_3$, stearate or oleate of Ca, Mg, Pb, Zn etc. The metal compound may be added alone or in the presence of a basic organic compounds such as: diphenyl guanidine, hexamethylene diamine, pyridine, triethanolamine, or commercial mixtures of organic bases such as the condensation product of ammonia with formaldehyde and ethyl chloride (Vulcafor EFA), and mixtures of thiazole and hexamethylenetetramine. If such a basic organic compound is also present it should be in an amount from about 0.1 to 10% based on the filler.

The best results in the production of transparent or colored products having high mechanical characteristics are obtained using magnesium oxide in a quantity corresponding to about 5% of the filler. Very good results are also obtained using lead oxide (in an amount corresponding to about 2% of the filler when clay fillers are used). When the basic organic substances are used, as indicated above, about 1% based on the filler is effective.

The presence of metal oxides contributes another rather noteworthy advantage in that such oxides increase the flex fatigue life of the vulcanizate. The products containing such oxides have a lower hysteresis heat and do not exhibit blow-out characteristics as determined by the Goodrich deflectometer.

Lead oxide in particular improves the dielectric characteristics and decreases the water absorption of the vulcanized products.

The following examples will further illustrate our invention. All parts are by weight unless otherwise stated.

The tensile tests on the vulcanized products are carried out on specimens press cut from sheets of 120 x 120 x 2 mm. These specimens were of the "C" type as defined by ASTM Specification D412–51T. The specimens were subjected to tension at a rate of separation of the tensile grips of 500 mm. per minute.

The residual elongation was determined on specimens having a useful portion of 5 cm. Each specimen was maintained under tension at 200% elongation for 1 hour, then released, and after 1 minute the elongation was determined.

By modulus of elasticity we mean the value obtained at 300% elongation. The tests on the Goodrich deflectometer were carried out on standard specimens prepared according to ASTM Specification D623–52T, method A, with an applied load of 9.98 kg./cm.$^2$ and a compression strain of 0.63 cm. for 30 minutes at a conditioning temperature of 30° C.

*Example 1*

100 parts ethylene-propylene copolymer having a molecular weight of 80,000 and containing 48.5 mole percent propylene are introduced into a roll mixer at a temperature of 25–30° C. and are processed for 10 minutes until a homogeneous sheet is obtained. 50 parts carbon black EPC are introduced, the whole is homogenized for 10–15 minutes, and 0.45 part sulfur and 4 parts tetrachloro-tert. butyl peroxide are added thereto. The product is vulcanized in a press at 155° C. for 45 minutes. The vulcanizate presents the following mechanical characteristics:

Tensile strength _____ kg./cm.$^2$__ 181
Elongation at break _____ percent __ 400
Modulus of elasticity _____ kg./cm.$^2$__ 98
Residual elongation _____ percent __ 7

*Example 2*

Using the procedure of Example 1, a mix is prepared containing 100 parts ethylene-propylene copolymer (having a molecular weight of 500,000 and a $C_3$-content of 48 mole percent, 50 parts carbon black HPC, 0.45 part sulfur and 4 parts tetrachloro-tert. butyl-peroxide. The product is vulcanized in a press at 155° C. for 45 minutes. The vulcanizate presents the following mechanical characteristics:

Tensile strength _____kg./cm.² __ 170
Elongation at break _____percent__ 480
Modulus of elasticity _____kg./cm.² __ 92
Residual elongation _____percent__ 15

*Example 3*

Following the procedure of Example 1, a mix is prepared containing 100 parts ethylene-propylene copolymer (the same kind as used in Example 2), 50 parts carbon black HPC, 5 parts zinc oxide, 0.45 part sulfur, and 4 parts tetrachloro-tert. butyl peroxide. The product is vulcanized in a press at 155° C. for 45 minutes. The vulcanizate presents the following characteristics:

Tensile strength _____kg./cm.² __ 174
Elongation at break _____percent__ 470
Modulus of elasticity _____kg./cm.² __ 106
Residual elongation _____percent__ 11

*Example 4*

100 parts ethylene-propylene copolymer (having a molecular weight of 52,000 and containing 47 mole percent propylene) are introduced into a roll mixer and are processed for about 10 minutes at 25–30° C. until a homogeneous sheet is obtained. 0.5 part 2,6-di-tert.butyl-4-methyl phenol (Catalin AC/3) and 100 parts iceberg kaolin are successively introduced. After homogenization for about 20 minutes, 0.45 part sulfur and 4 parts tetrachloro-tert. butyl peroxide are added. The product is vulcanized in a press at 160° C. for 45 minutes. The vulcanizate presents the following mechanical characteristics:

Tensile strength _____kg./cm.² __ 67
Elongation at break _____percent__ 720
Modulus of elasticity _____kg./cm.² __ 50
Residual elongation _____percent__ 16

Tests on the Goodrich deflectometer produce the following results:

Initial static compression _____percent__ 13
Deformation _____
ΔT° C. (change in temperature) _____
The specimen "blows out" after 15 minutes.

*Example 5*

Using the procedure of Example 4, a mix is prepared containing 100 parts of the copolymer used in Example 4, 0.5 part 2,6-di-tert. butyl-4-methyl phenol )Catalin AC/3), 100 parts iceberg kaolin, 2 parts magnesium oxide, 0.45 part sulfur, and 4 parts tetrachloro-tert. butyl peroxide. The product is vulcanized in a press at 160° C. for 45 minutes. The vulcanizate presents the following mechanical characteristics:

Tensile strength _____kg./cm.² __ 45
Elongation at break _____percent__ 450
Modulus of elasticity _____kg./cm.² __ 37
Residual elongation _____percent__ 10

Tests with the Goodrich deflectometer produce the following results:

Initial static compression _____ 11.8
Deformation _____percent__ 9.12
ΔT° C. _____° C__ 26

*Example 6*

Following the procedure of Example 4, a mix is prepared containing 100 parts of the copolymer used in Example 4. 0.5 part 2,6-di-tert. butyl-4-methyl phenol (Catalin AC/3), 100 parts iceberg kaolin, 2 parts lead oxide, 0.45 part sulfur, and 4 parts tetrachloro-tert. butyl peroxide. The product is vulcanized in a press at 160° C. for 45 minutes. The vulcanizate presents the following mechanical characteristics:

Tensile strength _____kg./cm.² __ 49
Elongation at break _____percent__ 445
Modulus of elasticity _____kg./cm.² __ 46
Residual elongation _____percent__ 9

Tests carried out with the Goodrich deflectometer produce the following results:

Initial static compression _____percent__ 12
Deformation _____do____ 4.82
ΔT° C. _____° C__ 21

*Example 7*

Using the procedure of Example 4, a mix is prepared containing 100 parts of the copolymer used in Example 4, 0.45 part 2,6-di-tert. butyl-4-methyl henol (Catalin AC/3), 100 parts iceberg kaolin, 1 part zinc oxide, 0.45 parts sulfur, and 4 parts tetrachloro-tert. butyl peroxide. The product is vulcanized in a press at 160° C. for 45 minutes. The vulcanizate presents the following mechanical characteristics:

Tensile strength _____kg./cm.² __ 50
Elongation at break _____percent__ 560
Modulus of elasticity _____kg./cm.² __ 37
Residual elongation _____percent__ 12

*Example 8*

Following the procedure of Example 4, a mix is prepared containing 100 parts of the copolymer used in Example 4, 0.45 part 2,6-tert. butyl-4-methyl phenol (Catalin AC/3), 100 parts iceberg kaolin, and 0.88 part tert. butyl peroxide. The product is vulcanized in a press at 165° C. for 60 minutes. The vulcanizate presents the following mechanical characteristics:

Tensile strength _____kg./cm.² __ 51
Elongation at break _____percent__ 800
Modulus of elasticity _____kg.cm.² __ 29
Residual elongation _____percent__ 20

*Example 9*

Using the procedure of Example 4, a mix is prepared containing 100 parts of the copolymer used in Example 4, 0.5 part 2,6-di-tert. butyl-4 methyl phenol (Catalin AC/3), 100 parts iceberg kaolin, 2 parts lead oxide, 0.88 part sulfur, and 4 parts tert. butyl peroxide. The product is vulcanized in a press at 165° C. for 60 minutes. The vulcanizate presents the following mechanical characteristics:

Tensile strength _____kg./cm.² __ 66
Elongation at break _____percent__ 700
Modulus of elasticity _____kg./cm.² __ 37
Residual elongation _____percent__ 13

*Example 10*

Using the procedure of Example 4, a mix is prepared containing 100 parts of the copolymer used in Example 4, 0.5 part 2,6-di-tert. butyl-4-methyl phenol (Cataline AC/3), 100 parts Franteg C (silica), 0.45 part sulfur, and 4 parts tetrachloro-tert. butyl peroxide. The product is vulcanized in a press at 160° C. for 45 minutes. The vulcanizate presents the following mechanical characteristics:

Tensile strength _____kg./cm.² __ 52
Elongation at break _____percent__ 490
Modulus of elasticity _____kg./cm.² __ 37
Residual elongation _____percent__ 9

Tests with Goodrich deflectometer produce the following results:

Initial static compression _____percent__ 20.4
Deformation _____do____ 18.9
ΔT° C. _____° C__ 31

Example 11

Using the procedure of Example 4, a mix is prepared containing 100 parts of the copolymer used in Example 4, 0.45 part 2,6-di-tert. butyl-4-methyl phenol (Catalin AC/3), 100 parts Franteg C, 2 parts lead oxide, 0.45 part sulfur, and 4 parts tetrachloro-tert. butyl peroxide. The product is vulcanized in a press at 160° C. for 45 minutes. The vulcanizate presents the following mechanical characteristics:

Tensile strength _____kg./cm.² __ 49
Elongation at break _____percent__ 370
Modulus of elasticity _____kg./cm.² __ 37
Residual elongation _____percent__ 9

Tests carried out with a Goodrich deflectometer produce the following results:

Initial static compression _____percent__ 20.1
ΔT° C. _____° C__ 24

Example 12

Using the procedure of Example 4, a mix is prepared containing 100 parts of the copolymer used in Example 4, 0.5 part 2,6-di-tert. butyl-4-methyl phenol (Catalin AC/3), 100 parts china clay, 0.45 part sulfur, and 4 parts tetrachloro-tert. butyl peroxide. The product is vulcanized in a press at 160° C. for 45 minutes. The vulcanizate presents the following mechanical characteristics:

Tensile strength _____kg./cm.² __ 56
Elongation at break _____percent__ 700
Modulus of elasticity _____kg./cm.² __ 25
Residual elongation _____percent__ 20

Tests with a Goodrich deflectometer produce the following results:

Initial static compression _____percent__ 15.2

The specimen blows out 10 minutes after the commencement of the tests.

Example 13

Using the technique of Example 4, a mix is prepared containing 100 parts of the copolymer used in Example 4, 0.5 part 2,6-di-tert. butyl-4-methyl phenol (Catalin AC/3), 100 parts china clay, 2 parts magnesium oxide, 0.45 part sulfur, and 4 parts tetrachloro-tert. butyl peroxide. The product is vulcanized in a press at 160° C. for 45 minutes. The vulcanizate presents the following mechanical characteristics:

Tensile strength _____kg./cm.² __ 50
Elongation at break _____percent__ 620
Modulus of elasticity _____kg./cm.² __ 30
Residual elongation _____percent__ 16

Tests with a Goodrich deflectometer produce the following results:

Initial static compression _____percent__ 13.1
Deformation _____do____ 9.2
ΔT° C. _____° C__ 46

Example 14

Using the procedure of Example 4, a mix is prepared containing 100 parts of the copolymer used in Example 4, 0.5 part 2,6-di-tert. butyl-4-methyl phenol (Catalin AC/3), 100 parts china clay, 2 parts lead oxide, 0.45 part sulfur, and 4 parts tetrachloro-tert. butyl peroxide.

Tests with a Goodrich deflectometer produce the following results:

Initial static compression _____percent__ 10.5
Deformation _____do____ 12.3
ΔT° C. _____° C__ 42

Example 15

100 g. ethylene-propylene copolymer (having a molecular weight of 560,000 and containing 46 mole percent propylene) were introduced into a roll mixer and processed at 25–30° C. for about 15 minutes until a homogeneous sheet was obtained. 0.5 parts 2,6-di-tert. butyl-4-methyl phenol (Catalin AC/3), 40 parts silica (Ultrasil), 0.45 part sulfur, and 4 parts tetrachloro-tert. butyl peroxide were then introduced.

The product is vulcanized in a press at 160° C. for 45 minutes. The vulcanizate presents the following mechanical characteristics:

Tensile strength _____kg./cm.² __ 204
Elongation at break _____percent__ 700
Modulus of elasticity _____kg./cm.² __ 25
Residual elongation _____percent__ 14

Tests with a Goodrich deflectometer produce the following results:

Initial static compression _____percent__ 13.5
Deformation _____do____ 15.4
ΔT° C. _____° C__ 24

Example 16

Using the procedure of Example 15, a mix is prepared containing 100 parts of the copolymer used in Example 15. 0.5 part 2,6-di-tert. butyl-methyl phenol (Catalin AC/3), 40 parts silica (Ultrasil), 2 parts magnesium oxide, 0.45 part sulfur, and 4 parts tetrachloro-tert. butyl peroxide. The product is vulcanized in a press at 160° C. for 45 minutes. The vulcanizate presents the following mechanical characteristics:

Tensile strength _____kg./cm.² __ 133
Elongation at break _____percent__ 630
Modulus of elasticity _____kg./cm.² __ 33
Residual elongation _____percent__ 11

Tests with a Goodrich deflectometer produce the following results:

Initial static compression _____percent__ 11
Deformation _____do____ 11.2
ΔT° C. _____° C__ 19

Example 17

Using the procedure of Example 15, a mix is prepared containing 100 parts of the copolymer used in Example 15, 0.5 part 2,6-di-tert. butyl-4-methyl phenol (Catalin AC/3), 40 parts silica (Ultrasil), 2 parts lead oxide, 0.45 part sulfur, and 4 parts tetrachloro-tert. butyl peroxide. The product is vulcanized in a press at 160° C. for 45 minutes. The vulcanizate presents the following mechanical characteristics:

Tensile strength _____kg./cm.² __ 124
Elongation at break _____percent__ 560
Modulus of elasticity _____kg./cm.² __ 29
Residual elongation _____percent__ 10

Tests with a Goodrich deflectometer produce the following results:

Initial static compression _____percent__ 11.9
Deformation _____do____ 9.3
ΔT° C. _____° C__ 15

Example 18

Using the procedure of Example 15, a mix is prepared containing 100 parts of the copolymer used in Example 15, 0.5 part 2,6-di-tert. butyl-4-methyl phenol (Catalin AC/3), 40 parts silica (Ultrasil), 2 parts magnesium oxide, 0.1 part diphenyl guanidine, 0.45 part sulfur, and 4 parts tetrachloro tert. butyl peroxide. The product is vulcanized in a press at 160° C. for 45 minutes. The vulcanizate presents the following mechanical characteristics:

Tensile strength _____kg./cm.$^2$__ 170
Elongation at break _____percent__ 600
Modulus of elasticity _____kg./cm.$^2$__ 30
Residual elongation _____percent__ 9

*Example 19*

Using the procedure of Example 16, a mix is prepared containing 100 parts of the copolymer used in Example 16, 0.5 part 2,6-di-tert. butyl-4-methyl phenol (Catalin AC/3), 30 parts silica (Ultrasil), 0.88 part sulfur, and 4 parts tert. butyl peroxide. The product is vulcanized in a press at 165° C. for 60 minutes. The vulcanizate presents the following mechanical characteristics:

Tensile strength _____kg./cm.$^2$__ 150
Elongation at break _____percent__ 700
Modulus of elasticity _____kg./cm.$^2$__ 21
Residual elongation _____percent__ 15

*Example 20*

Using the procedure of Example 16, a mix is prepared containing 100 parts of the copolymer used in Example 16, 0.5 part 2,6-di-tert. butyl-4-methyl phenol (Catalin AC/3), 30 parts silica (Ultrasil), 2 parts magnesium oxide, 0.88 part sulfur, and 4 parts tert. butyl peroxide. The product is vulcanized in a press at 165° C. for 60 minutes. The vulcanizate presents the following mechanical characteristics:

Tensile strength _____kg./cm.$^2$__ 110
Elongation at break _____percent__ 510
Modulus of elasticity _____kg./cm.$^2$__ 32
Residual elongation _____percent__ 10

*Example 21*

Using the procedure of Example 16, a mix is prepared containing 100 parts of the copolymer used in Example 16, 0.5 part 2,6-di-tert. butyl-4-methyl phenol (Catalin AC/3), 40 parts silica Aerosil, 2 parts magnesium oxide, 0.45 part sulfur, and 4 parts tetrachloro-tert. butyl peroxide. The product is vulcanized in a press at 160° C. for 45 minutes. The vulcanizate presents the following mechanical characteristics:

Tensile strength _____kg./cm.$^2$__ 250
Elongation at break _____percent__ 680
Modulus of elasticity _____kg./cm.$^2$__ 33
Residual elongation _____percent__ 16

*Example 22*

Using the procedure of Example 1, a mix is prepared, containing 100 parts of an ethylene-propylene copolymer (having a molecular weight of 530,000 and consisting of 50 mole percent propylene), 50 parts carbon black HAF, 0.45 part sulfur, and 4 parts tetrachloro-tert. butyl peroxide. The product is vulcanized in a press at 160° C. for 45 minutes. The vulcanizate presents the following mechanical characteristics:

Tensile strength _____kg./cm.$^2$__ 240
Elongation at break _____percent__ 430
Modulus of elasticity _____kg./cm.$^2$__ 131
Residual elongation _____percent__ 6

Tests with a Goodrich deflectometer produce the following results:

Initial static compression _____percent__ 12.7
Deformation _____do____ 1.7
ΔT° C. _____° C__ 36

*Example 23*

Using the procedure of Example 16, a mix is prepared containing 100 parts of the copolymer used in Example 16, 50 parts carbon black HAF, 2 parts magnesium oxide, 0.45 part sulfur, and 4 parts tetrachloro-tert. butyl peroxide. The product is vulcanized in a press at 160° C. for 45 minutes. The vulcanizate presents the following mechanical characteristics:

Tensile strength _____kg./cm.$^2$__ 250
Elongation at break _____percent__ 450
Modulus of elasticity _____kg./cm.$^2$__ 129
Residual elongation _____percent__ 6

Tests with a Goodrich deflectometer produce the following results:

Initial static compression _____percent__ 10.2
Deformation _____do____ 1.7
ΔT° C. _____° C__ 32

*Example 24*

100 parts ethylene-butene copolymer having a molecular weight of 100,000 and containing 40.5 butene-1 by mols are introduced into a roll mixer and are processed at the temperature of 25°–30° C. for about 10 minutes until a homogeneous sheet is obtained.

0.5 part 2.6-di-tert. butyl-4-methylphenol (Catalin AC/3) and 100 parts iceberg kaolin are then added.

After homogenization for about 90 minutes 0.45 part sulfur and 4 parts tetrachloro-tert. butyl peroxide are added.

The product vulcanized in a press at 160° C. for 45 minutes shows following mechanical characteristics:

Tensile strength _____kg./cm.$^2$__ 55
Elongation at break _____percent__ 750
Modulus of elasticity _____kg./cm.$^2$__ 43
Residual elongation _____percent__ 16

*Example 25*

With the technique of Example 24 a mix containing 100 p. of same ethylene-butene copolymer used in the preceding example, 0.5 p. Catalin AC/3, 100 p. iceberg kaolin, 2 p. lead oxide, 0.45 p. sulfur and 4 p. tetrachloro-tert. butyl peroxide.

The product vulcanized in a press at 160° C. for 45 minutes shows following mechanical characteristics:

Tensile strength _____kg./cm.$^2$__ 47
Elongation at break _____percent__ 465
Modulus of elasticity _____kg./cm.$^2$__ 44
Residual elongation _____percent__ 11

*Example 26*

Following mixes were prepared with an ethylene-propylene copolymer having a molecular weight of 150,000 and containing 47% propylene by mols:

Ethylene-propylene copolymer _____ 100 parts.
Carbon black HPC _____ 50 parts.
Sulfur _____ Variable.
2,5-dimethyl-2,5-di-(ter. butyl peroxy) hexane mixed with CaCo$_3$ in a 1:1 ratio ____ 4,3 (0.0074 by mols).

Sheets of 120 x 120 x 2 mm. prepared by vulcanizing in a press at 165° C. for 60 minutes presented following characteristics:

| S parts, percent | S (atom grams)/ peroxide by mols | tensile strength kg./cm$^3$ | modulus at 300— | elongation at break percent | Residual elongation at 200%, percent |
|---|---|---|---|---|---|
| 0 | 0 | 52 | 39 | 500 | 50 |
| 0.05 | 0.2 | 80 | 60 | 450 | 24 |
| 0.07 | 0.3 | 105 | 80 | 430 | 18 |
| 0.12 | 0.5 | 147 | 95 | 435 | 12 |
| 0.17 | 0.7 | 160 | 103 | 420 | 9.5 |
| 0.24 | 1 | 182 | 110 | 435 | 7.5 |
| 0.36 | 1.5 | 173 | 100 | 490 | 8.5 |
| 0.48 | 2 | 170 | 87 | 520 | 11 |
| 1.20 | 5 | 168 | 63 | 610 | 14 |

Variations can of course be made without departing from the spirit of our invention.

Having thus described the invention, what we desire to secure and claim by Letters Patent is:

1. A process for vulcanizing a mix consisting essentially of (1) an amorphous saturated copolymer of an ethylene with a higher alpha-olefin, and (2) an acid filler selected from the group consisting of channel carbon black, clay and silica, this process comprising adding to said mix (3) from about 0.3 to about 1.5 g.-atoms of sulfur per mole of the following peroxide and (4) from about 0.5 to about 10% based on the weight of the copolymer of said peroxide selected from the group consisting of peroxides represented by the formula:

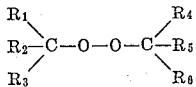

wherein $R_1$, $R_2$, $R_3$, $R_4$, $R_5$, and $R_6$ are each selected from the group consisting of alkyl radicals and halogen-substituted alkyl radicals, and heating the resulting mixture to a temperature of from about 110° C. to 220° C. to effect vulcanization thereof.

2. The process of claim 1, wherein the peroxide is tertiary amyl peroxide.

3. The process of claim 1 wherein the peroxide is tertiary butyl peroxide.

4. The process of claim 1 wherein the peroxide is tetrachloro-tertiary butyl peroxide.

5. The process of claim 1 wherein the peroxide is used in an amount of from about 0.5 to 10% of the weight of the copolymer.

6. The process of claim 1 wherein the amount of sulfur present in the vulcanization mix is 0.0001 to 20 gram atoms per mole of peroxide.

7. The process of claim 1 wherein the amount of sulfur present in the vulcanization mix is from about 0.5 to 1.5 gram atoms per mole of peroxide.

8. The process of claim 1 wherein the copolymer has a molecular weight of at least 60,000 and contains from about 10 to 80 mole percent ethylene.

9. The product of the process of claim 1.

10. The method of claim 1 wherein the alpha-olefin is propylene.

11. The method of claim 1 wherein the alpha-olefin is butene.

References Cited in the file of this patent
UNITED STATES PATENTS

| | | |
|---|---|---|
| 2,628,214 | Pinkney et al. | Feb. 10, 1953 |
| 2,710,291 | Little | June 7, 1955 |
| 2,748,104 | Viohl | May 29, 1956 |
| 2,927,904 | Cooper | Mar. 8, 1960 |
| 2,930,083 | Vostovich et al. | Mar. 29, 1960 |
| 2,938,012 | Filar | May 24, 1960 |
| 2,958,672 | Goldberg | Nov. 1, 1960 |
| 2,983,714 | Robinson et al. | May 9, 1961 |
| 3,012,016 | Kirk et al. | Dec. 5, 1961 |

FOREIGN PATENTS

| | | |
|---|---|---|
| 567,253 | Belgium | May 14, 1958 |
| 564,040 | Canada | Sept. 30, 1958 |